United States Patent [19]
Kassel

[11] 3,785,896
[45] Jan. 15, 1974

[54] TIRE PUNCTURE REPAIR SYSTEM

[76] Inventor: Joseph B. Kassel, 150 E. 19th St., Brooklyn, N.Y. 11226

[22] Filed: Nov. 6, 1972

[21] Appl. No.: 303,856

[52] U.S. Cl.................... 156/97, 81/15.7, 152/370
[51] Int. Cl. .......................................... B60c 25/16
[58] Field of Search.......................... 81/15.7, 15.5; 152/370; 156/97

[56] References Cited
UNITED STATES PATENTS

| 532,960 | 1/1895 | Hitchcock | 81/15.7 |
| 604,768 | 5/1898 | La Clair | 81/15.7 |
| 606,570 | 6/1898 | McAllister | 81/15.7 |
| 1,385,591 | 7/1921 | Stafiej | 81/15.7 |
| 3,073,191 | 1/1963 | Sharpe | 81/5.7 |

Primary Examiner—Harold D. Whitehead
Assistant Examiner—Roscoe V. Parker
Attorney—Natter & Natter

[57] ABSTRACT

A tire puncture repair system includes an implement for forming a repair plug and inserting same into a tire casing to seal a puncture wound. The implement includes an insertion needle having a hook adjacent its free end and a gaff retractable away from the needle. To form a plug, an elastic loop constructed of an endless strand of non-circular transverse cross-section is placed between the needle hook and the gaff. The gaff is operable to simultaneously twist and stretch the strand into a helically convoluted elongated configuration. The plug thus formed is coated with a suitable cement and inserted through the puncture wound with the needle. The gaff is then returned to its original position and disengaged from the plug after which the needle is disengaged from the plug and withdrawn, leaving a stretched convoluted plug sealing the wound.

12 Claims, 12 Drawing Figures

PATENTED JAN 15 1974 3,785,896
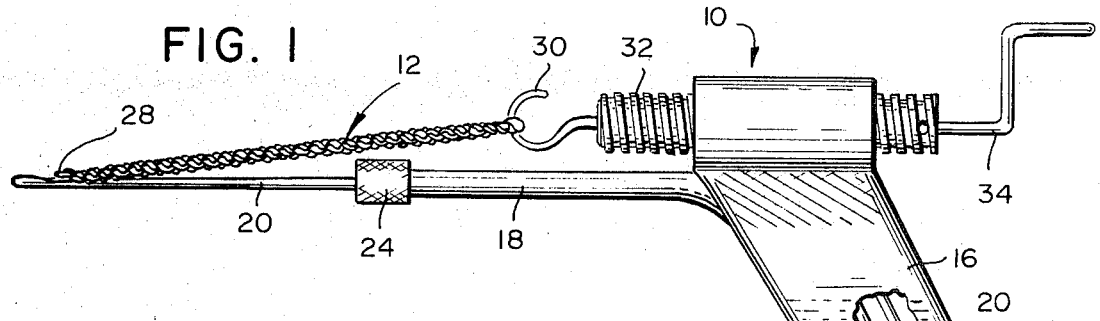
FIG. 1
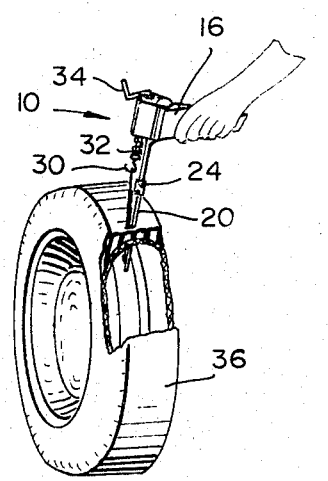
FIG. 2
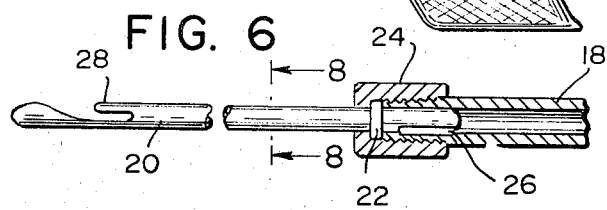
FIG. 6
FIG. 3
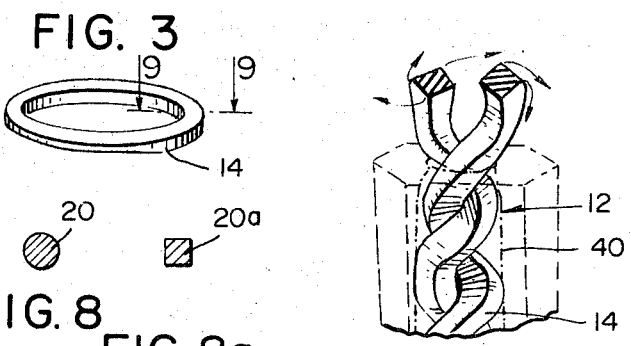
FIG. 7
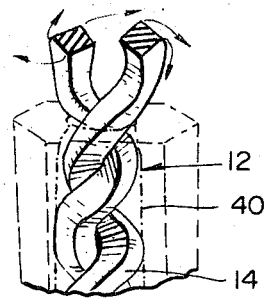
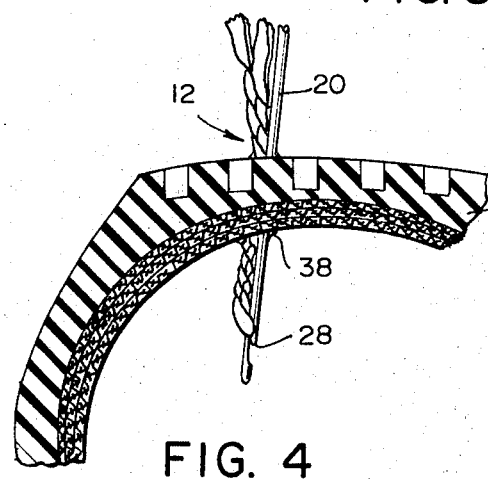
FIG. 4
FIG. 5
FIG. 8  FIG. 8a
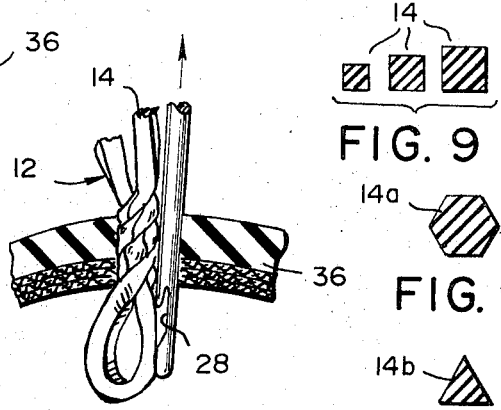
FIG. 9
FIG. 9a
FIG. 9b

TIRE PUNCTURE REPAIR SYSTEM

BACKGROUND OF THE INVENTION

1. Field of the Invention

This invention relates to tire puncture repair systems and, in particular, systems for implanting a convoluted plug into a puncture wound.

2. Brief Description of the Prior Art

Many devices have been used heretofore for the purpose of sealing puncture wounds in pneumatic tire casings. For the most part, these devices had substantial drawbacks which accompanied their usage. Among such previous devices have been hot and cold vulcanizing patches, applied to the inside of the tire casing. Unfortunately, the application of patches inside the tire casing necessitated the removal of the tire from the rim to which it was mounted. When the punctured tire was a tubeless tire, the removal of the tire from the rim was especially undesirable since it necessitated a breaking of the joint between the tire casing and the rim thereby increasing the possibility of subsequent joint leakage. Furthermore, removal of a tire casing from the rim necessitated a rebalancing of the tire after the casing was again mounted. It will be appreciated that such repair was costly and time consuming.

An additional drawback encountered with the use of patches applied inside the tire casing was the fact that the seal applied to the puncture wound was formed only at the inner casing wall. The wound was not sealed throughout its length. Thus, the probability of subsequent leakage was presented.

Conventional tubeless tire repair plugs, the use of which did not necessitate the removal of the tire from the rim, generally included a cylindrical body which was forced into the tire casing puncture wound. A common plug utilized a mushroom head at the end of a hollow cylindrical stem. To repair the wound, a gun was used to force the plug, head first, through the tire casing wound. Among the problems encountered with this type of tire repair was that a large proportion of tire wounds were made by irregularly shaped objects, e.g. glass fragments, which provided an irregularly shaped puncture aperture through the tire casing. The cylindrical plug stem did not effectively seal the wound since it could not abut and close the aperture walls at internal acute angles in corners of such irregularly shaped wounds.

A further problem encountered with the utilization of cylindrical bodies plugs was that while the head substantially prevented the plug from being expelled through the tire casing, the cylindrical stem was frequently forced inwardly into the air space between the tire casing and the rim when the vehicle was driven over obstacles such as stones and the like.

A further type of puncture repair utilized heretofore is exemplified by U.S. Pat. No. 617,810 and basically provided a device for stretching multiple rubber bands which were then forced through a puncture aperture with a needle. The needle was withdrawn after the rubber bands were permitted to relax. This system for sealing puncture repairs did not gain widespread acceptance, especially with current tubeless tire repair applications since many inherent disadvantages were presented. Among the disadvantages of this type of puncture repair was that the bands could not be tensioned sufficiently to assure that they would present a secure and tight seal of the puncture wound. Furthermore, the inability to sufficiently stretch the rubber bands prevented a tight confining engagement of the bands which led to the dislodgement of the bands from the tire casing with the resultant opening of the puncture aperture. A further problem encountered was air leakage between the many strands of the plug.

SUMMARY OF THE INVENTION

The present invention provides for a puncture repair plug comprising an elastic loop formed of an endless strand of puncture repair material, e.g. rubber, the loop is initially positioned on an insertion tool by being engaged between a hook adjacent the end of an insertion needle and a retractable gaff. The strand is preferably of non-circular transverse cross-section to thereby provide a plurality of sealing edges for repairing a non-circular puncture wound. The gaff is operable to simultaneously retract away from the insertion needle and rotate to thereby stretch and form convolutions in the strand. The plug formed is then dipped in a suitable cement and inserted through the puncture wound. The plug is then disengaged from the tool and removed from the tire casing. Although tightly confined in the wound, the stretched loop will elastically tend to both expand and untwist. These elastic attributes serve to provide an effective permanently sealed puncture repair.

From the above summary it will be appreciated that it is an object of the present invention to provide a tire puncture repair system of the general character described which is so constructed that it is not subject to any of the aforementioned disadvantages.

It is the further object of the present invention to provide a tire puncture repair system of the general character described which is practical, low in cost, lends itself to mass production fabrication techniques and provides for simple, fast and effective repairing of puncture wounds.

A still further object of the present invention is to provide a tire puncture repair system of the general character described which effectively seals internal corners of a non-circular tire puncture. Yet a further object of the present invention is to provide a tire puncture repair system of the general character described wherein an elastic loop is simultaneously stretched and convoluted before insertion into a tire puncture to thereby effectively seal the puncture against subsequent leakage.

Other objects of the present invention in part will be obvious and in part will be pointed out hereinafter.

With these ends in view, the invention finds embodiment in certain combinations of elements and arrangements of parts by which the said objects and certain other objects are hereinafter attained, all as fully described with reference to the accompanying drawings, and the scope of which is more particularly pointed out and indicated in the appended claims.

BRIEF DESCRIPTION OF THE DRAWINGS

In the accompanying drawings in which are shown some of the various exemplary embodiments of the invention, FIG. 1 is a front elevational view of a tire plug forming and insertion implement constructed in accordance with and embodying the invention and illustrating a stretched puncture repair plug extending between an insertion needle and a retractable gaff;

FIG. 2 is a perspective illustration showing the manner in which the insertion implement is employed to repair a puncture wound in a tire casing and with a portion of the tire casing cut away for the purpose of clarity;

FIG. 3 is a perspective illustration of a typical elastic loop employed in conjunction with the insertion implement and which is both stretched and twisted to form a repair plug;

FIG. 4 is an enlarged fragmentary sectional view through a tire casing and showing the manner in which the repair plug is forced through a puncture wound;

FIG. 5 is a further fragmentary sectional illustration of the tire casing, similar to that shown in FIG. 4 and illustrating the procedure of removing the insertion needle from the tire casing;

FIG. 6 is an elevational view, similar to that of FIG. 1, wherein a portion of the insertion implement is broken away and more clearly showing a typical insertion needle and the manner in which it is removably secured to the implement;

FIG. 7 is a distorted cut-away perspective illustration of a tire casing puncture wound, in phantom, wherein the wound has been repaired with a plug in accordance with the present invention;

FIGS. 8 and 8a are enlarged transverse cross-sectional views through the insertion needle, the same being taken substantially along the line 8—8 of FIG. 6 and showing alternate embodiments; and FIGS. 9, 9a and 9b are enlarged cross-sectional illustrations through the elastic loop, the same being taken substantially along the line 9—9 of FIG. 3 and showing in FIG. 9, an assortment of loops, and in FIGS. 9a and 9b, alternate embodiments of typical non-circular cross-sectional configurations of the endless strand forming a loop.

DESCRIPTION OF THE PREFERRED EMBODIMENTS

Referring now in detail to the drawings, the reference numeral 10 denotes an insertion implement or tool constructed in accordance with and embodying the invention. The insertion tool 10 is initially utilized to form a repair plug 12 by stretching and twisting an elastic loop 14. The tool 10 includes a pistol grip stock 16 from which a forwardly projecting shank 18 extends.

An insertion needle 20 is releasably mounted to the free end of the shank 18 so that any selected one of a number of differently sized needles can be employed for utilization in repairing a puncture wound in accordance with the size of the wound. To releasably mount the needle 20, the hollow shank 18 is threaded adjacent its free end and the blunt end of the needle is acommodatingly fitted within the hollow shank until a shoulder stop 22, fixed on the needle, abuts the shank 18. A collar nut 24 is then tightened against the stop 22 to lock the needle 20 in position.

To prevent rotation of the needle relative to the insertion tool 10, the needle may have a keyway adjacent the blunt end and, a key 26, fixed in the shank bore, engages the keyway.

As shown in FIG. 8, the needle may be of circular cross-section. Optionally, a non-circular cross-section such as that shown in FIG. 8a may be utilized for a needle 20a. If such non-circular cross-section is utilized for the needle, it will be appreciated that the shank will include a non-circular passage therein for receiving the needle.

Adjacent the forward tip of the needle 20, a crochet type hook 28 may be formed. Such hook configuration is desirable in that it will permit a formed plug to be disengaged from the needle so that the needle may be subsequently withdrawn through the puncture wound without pulling the repair plug out of the wound. The utilization of a crochet hook 28 is merely exemplary, however, and it will be appreciated that the forward tip of the needle 20 may optionally comprise a forwardly facing "U"-shaped hook (not shown) which will provide substantially the same function as the crochet hook 28.

To form a puncture repair plug, an elastic loop 14 is extended between the needle hook 28 and a gaff 30. The gaff is fixed at one end to a threaded shaft 32 which is threadingly engaged in a bore formed in the stock 16. The opposite end of the shaft 32 includes a crank 34 for rotating the shaft.

Rotation of the crank 34 in one direction causes the shaft 32, hence the gaff 30, to move away from the needle hook 28 to thereby simultaneously stretch and twist the elastic loop 14. Rotation in the opposite direction will both untwist and relax the loop 14.

The elastic loop 14 is typically formed of an endless strand of non-circular transverse cross-section as shown in FIG. 9. Alternate cross-sectional embodiments 14a and 14b are shown in FIGS. 9a and 9b respectively. The utilization of a non-circular transverse cross-section for the strand is of significance as will be explained hereinafter. From an observation of FIG. 3, it will be seen that a strand forming a typical loop may be of gradually tapering thickness, that is, of an increasing and decreasing thickness along the periphery of the loop. When initially placed on the insertion tool, the zone of minimum thickness will be engaged in the hook 28, while the maximum thickness zone engages the gaff. The tapering in thickness of the lug formed in the tool 10 provides an effective seal and facilitates easy insertion into a puncture wound.

When initially positioned on the insertion tool 10, the elastic loop 14 extends between the hook 28 and the gaff 30 in a slightly stretched elongated configuration and with the strand forming two substantially parallel elements joined by arcuate portions at the hook and gaff respectively. The crank is then rotated to retract the gaff away from the hook 28 while simultaneously twisting the elements so that the elements form helical convolutions about one another. The stretched and convoluted loop thus forms the repair plug 12 suitable for insertion into a puncture wound of a tire casing. To prevent the crank 34 from inadvertently unwinding, the crank is pivoted about the shaft 32 and engaged in a slot formed in the stock 16.

In FIG. 2, the step of inserting a repair plug 12 into a tire casing 36 is illustrated. It should be appreciated that prior to this insertion step, the repair plug is coated with a suitable cement 38, e.g. a vulcanizing cement, by dipping the needle into a container carrying the cement. Optionally, the cement may be brushed on the repair plug and needle to provide both a lubricating and sealing medium.

As shown in FIG. 2, the needle 20 is forced through the puncture wound of the tire casing until it extends well past the inner face of the tire casing to a position substantially shown in FIG. 4. At this point, the repair plug is disengaged from the insertion tool by first relaxing that portion of the repair plug extending from the tire casing to the gaff. This is accomplished by rotating the crank in the reverse direction so that the gaff moves toward the needle hook 28. The repair plug is then disengaged from the gaff and the insertion tool manipulated so that the opposite end of the repair plug is disengaged from the hook 28 as shown in FIG. 5. The needle is thereafter pulled from the puncture wound leaving the repair plug seated on the wound aperture.

The portion of the repair plug 12 projecting above or beyond the tire casing tread is then excised.

The utilization of a loop of non-circular transverse cross-section for the plug is particularly advantageous since it provides a plurality of sealing edges within the confines of the puncture aperture to complement any jagged internal corners of the aperture formed by an irregularly shaped object which caused the puncture wound. Typical of such irregularly shaped road hazards are glass fragments.

The convoluted loop which forms the plug maintains an elastic tendency to both untwist within the puncture wound and expand from its stretched, elongated shape. This tendency to untwist causes the corner edges of the loop strand to seat in sealing engagement against internal corners of the irregular puncture wound.

The theory of this sealing phenomenon is illustrated in FIG. 7 wherein a fragment of the plug 12 is illustrated extending within a greatly enlarged (out of proportion) phantom illustration of a puncture aperture 40. It should be appreciated that in actuality, the thickness of the plug is such that the strand is tightly received within the confines of the puncture aperture 40. For the purposes of illustration, however, the aperture is shown greatly enlarged and out of proportion to observe that the tendency of the plug to untwist will cause portions of the side walls of the plug elements to seat within internal corners or crevices, possibly as illustrated in the heavy arrows of FIG. 7. It must be realized, however, that the actual untwisting motion within the puncture aperture is very minute and the plug remains substantially in tightly convoluted form confined against movement by the surrounding tire casing.

When utilizing the present invention to provide a tire puncture repair, a needle of desired thickness, suitable for the particular size puncture wound being repaired, is selected from a number of needles carried within a compartment (see FIG. 1) formed in the hollow grip of the stock 16. Similarly, an elastic element 14 of a length, thickness, and cross-section suitable for application in the particular puncture wound is selected from an assortment provided with the insertion tool 10. Once the proper needle 20 and elastic loop 14 are selected, a repair plug is formed and inserted with a minimal amount of effort and labor.

It will thus be seen that there is provided a tire puncture repair system which achieves the various objects of the invention and which is well suited to meet conditions of practical use.

As various changes might be made in the system as above set forth, it is to be understood that all matter herein described or shown in the accompanying drawings is to be interpreted as illustrative and not in a limiting sense.

Having thus described the invention, there is claimed as new and desired to be secured by letters patent:

1. A tire puncture repair device for sealing a puncture wound which extends through a tire casing without removing the casing from the rim to which it is mounted, said device comprising an implement for forming a repair plug from an elastic loop, the implement including a needle, means forming a hook adjacent the forward end of the needle, a gaff, the loop adapted to be positioned between the hook and the gaff, and means providing relative translational and rotational movement between the gaff and the hook so that the loop is both stretched and convoluted to thereby form a plug, the plug being implanted in the puncture wound when the forward end of the needle is thrust through the wound, the needle hook including means to disengage the plug from the needle to prevent withdrawal of the plug from the tire casing when the needle is withdrawn, whereby a convoluted stretched elastic plug is provided to effectively seal a puncture wound.

2. A tire puncture repair device constructed in accordance with claim 1 further including a stock, means securing the needle relative to the stock, the movement means including means rotatably securing the gaff relative to the stock, and the stock including means forming a pistol grip for manipulative insertion of the plug and the needle into the puncture wound.

3. A tire puncture repair device constructed in accordance with claim 2 wherein the stock includes a shank extending therefrom, the shank having a free end and means adjacent the free end for releasable securement of the needle.

4. A tire puncture repair device constructed in accordance with claim 1 further including a stock, the means for providing relative movement including a threaded shaft, means threadingly mounting the shaft to the stock, the gaff being secured to the shaft, and means for rotating the shaft whereby the loop is simultaneously stretched and twisted to form a repair plug.

5. A tire puncture repair kit constructed in accordance with claim 1 further including a plurality of differently sized loops, a loop suitable for a particular size puncture wound being selected and positioned between the hook and the gaff to form a repair plug.

6. A tire puncture repair kit constructed in accordance with claim 5 further including a plurality of differently sized needles, and means releasably securing a selected needle to the implement, whereby a needle suitable for a particular size loop and puncture wound may be selected to form and implant a plug in a wound.

7. A tire puncture repair kit constructed in accordance with claim 1 further including an elastic loop, the loop comprising an endless strand of non-circular transverse cross-section including a plurality of corners, the loop being stretched and convoluted to form a plug having a plurality of angular edges, whereby internal corners of an irregularly shaped puncture wound are effectively sealed.

8. A tire puncture repair kit constructed in accordance with claim 7 wherein a plurality of differently sized loops are provided, a loop suitable for a particular size aperture being selected and positioned between the hook and the gaff to form a repair plug.

9. A method of repairing a puncture wound in a tire casing with the device constructed in accordance with claim 1, said method including the following steps, providing an elastic loop, positioning the loop between the needle hook and the gaff, simultaneously stretching and twisting the loop to form a convoluted plug, inserting the needle and a portion of the plug through the wound aperture, and removing only the needle from the aperture.

10. A method in accordance with claim 9 wherein the elastic loop provided is formed of an endless strand of non-circular transverse cross-section having a plurality of corners, the plug including a plurality of edges maintaining a tendency to untwist after being implanted in the wound, the plug edges sealing against corners of an irregularly shaped puncture wound.

11. A tire puncture repair device constructed in accordance with claim 1 wherein the loop is rotated about an axis skew to the axis of the needle.

12. A tire puncture repair device constructed in accordance with claim 1 wherein the means providing rotational movement between the gaff and the hook includes means rotating the gaff about an axis other than the axis of the needle.

* * * * *